No. 648,546. Patented May 1, 1900.
J. F. BEGOLE.
ELECTRICAL MEASURING INSTRUMENT.
(Application filed Sept. 28, 1899.)
(No Model.) 3 Sheets—Sheet 1.

Witnesses
W. A. Alexander
David Stavenard

Inventor
J. F. Begole
By Attorneys
Fowler & Fowler

THE NORRIS PETERS CO., PHOTO-LITHO., WASHINGTON, D. C.

No. 648,546. Patented May 1, 1900.
J. F. BEGOLE.
ELECTRICAL MEASURING INSTRUMENT.
(Application filed Sept. 28, 1899.)
(No Model.) 3 Sheets—Sheet 2.
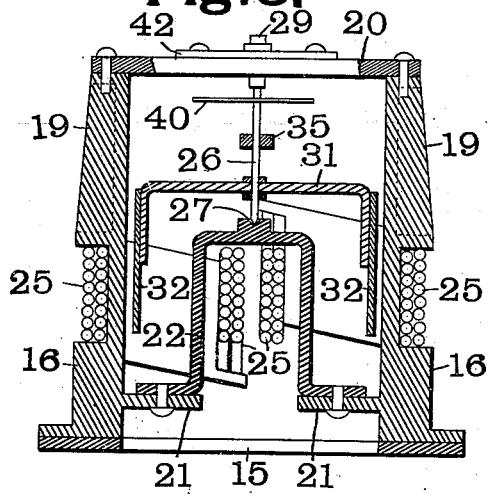
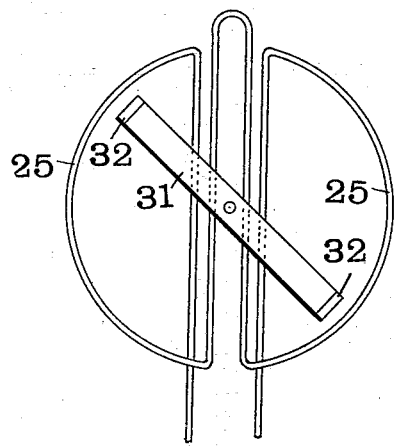
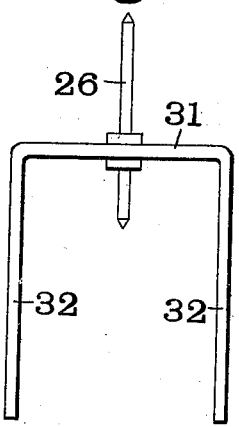
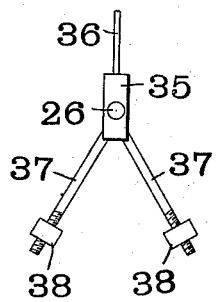
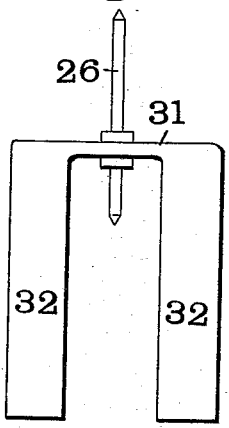
Witnesses
W. A. Alexander
David Stannard
Inventor
J. F. Begole
By Attorneys
Fowler & Fowler No. 648,546. Patented May 1, 1900.
J. F. BEGOLE.
ELECTRICAL MEASURING INSTRUMENT.
(Application filed Sept. 28, 1899.)
(No Model.) 3 Sheets—Sheet 3.

Witnesses
W. A. Alexander
David Stannard

Inventor
J. F. Begole
By Attorneys
Fowler & Fowler

UNITED STATES PATENT OFFICE.

JOSHUA F. BEGOLE, OF ST. LOUIS, MISSOURI.

ELECTRICAL MEASURING INSTRUMENT.

SPECIFICATION forming part of Letters Patent No. 648,546, dated May 1, 1900.

Application filed September 28, 1899. Serial No. 731,911. (No model.)

*To all whom it may concern:*

Be it known that I, JOSHUA F. BEGOLE, a citizen of the United States, residing at the city of St. Louis, in the State of Missouri, have invented a certain new and useful Electrical Measuring Instrument, of which the following is such a full, clear, and exact description as will enable any one skilled in the art to which it appertains to make and use the same, reference being had to the accompanying drawings, forming part of this specification.

One object of my invention is to provide an electrical measuring instrument in which the turning force will be substantially uniform for equal increments of current, and thus enable a substantially-uniform scale to be used.

Another object of my invention is to so construct the instrument that the action of the coil will tend to lift the weight of the moving parts, thus reducing the friction on the pivot, and hence making the instrument more delicate.

Still another object of my invention is to provide means for imparting to the moving parts an auxiliary turning force during the first part of the movement, thereby enabling the instrument to measure small quantities of current.

My invention consists, primarily, of a rotating indicator, a coil traversed by the current to be measured and inclined to the axis of said indicator, and an armature carried by said indicator, the same inclination being maintained between said coil and armature throughout the travel of said armature.

My invention also consists in other novel features and details of construction, all of which are described in the following specification and pointed out in the claims affixed hereto.

Figure 1:
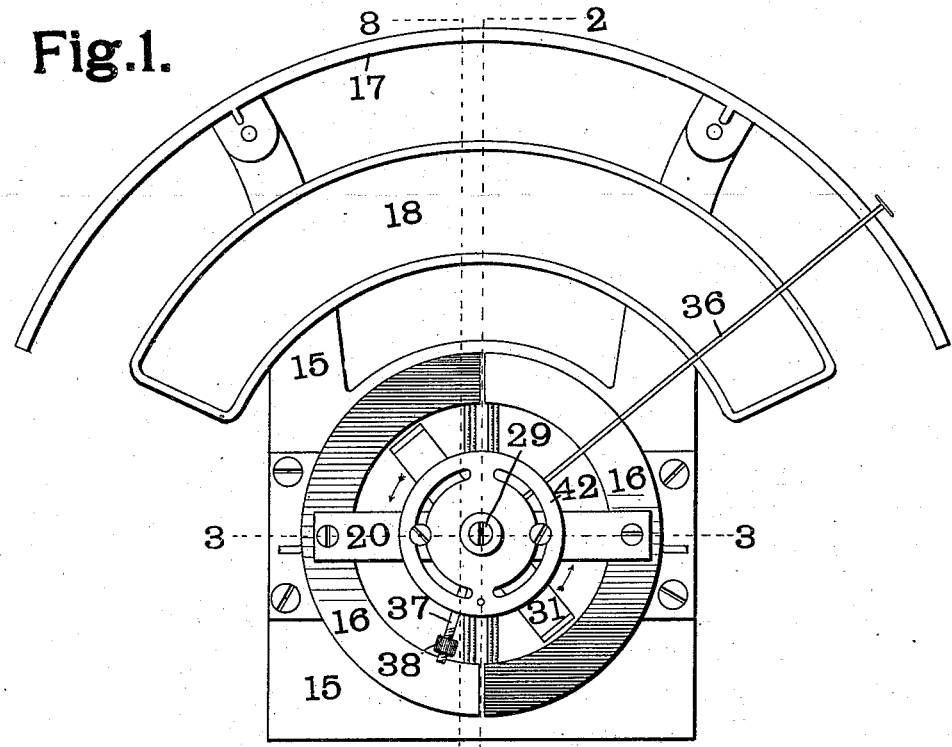
Figure 2:
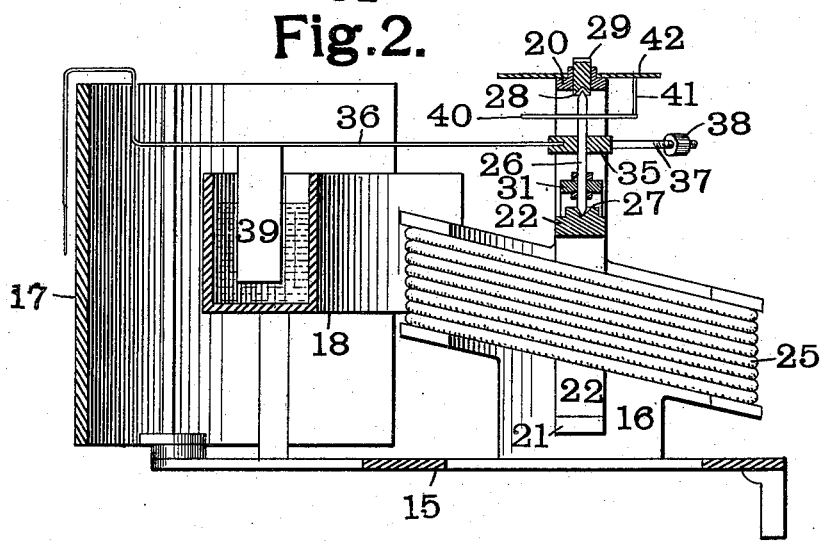
Figure 8:
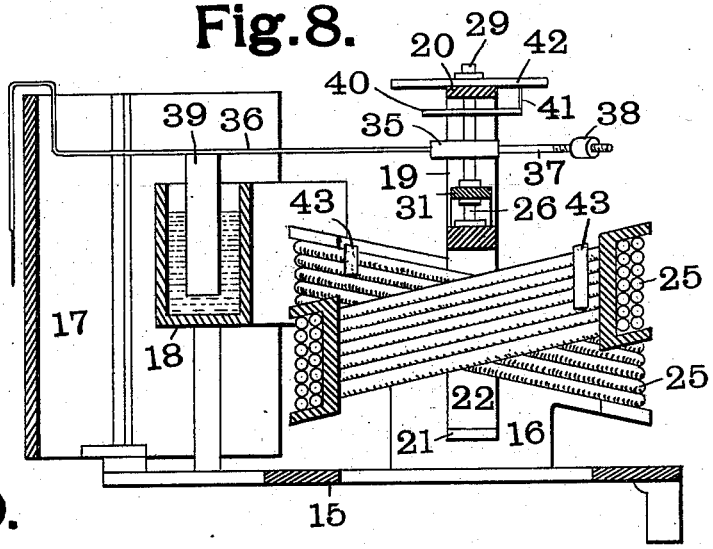
Figure 10:
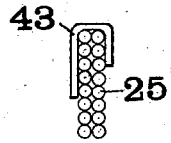
Figure 9:
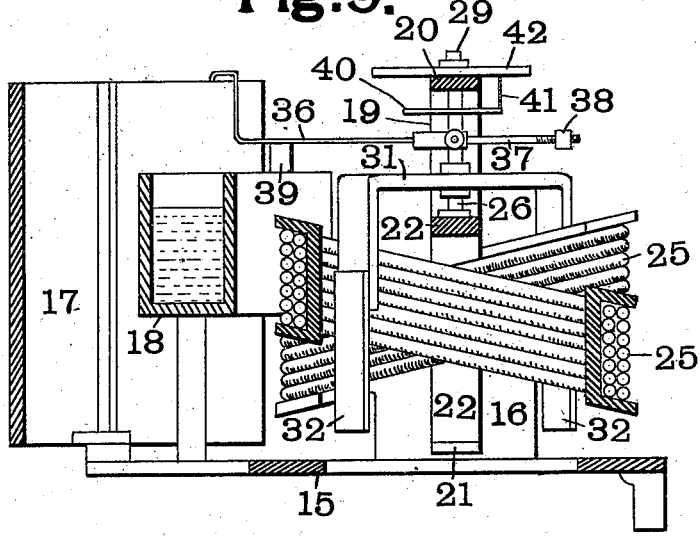

In the accompanying drawings, which illustrate an electrical measuring instrument made in accordance with my invention, Figure 1 is a top plan view. Fig. 2 is a section on the line 2 2 of Fig. 1, the indicator being shown in a different position. Fig. 3 is a section on the line 3 3 of Fig. 1, the parts being shown in the same position as in Fig. 2. Fig. 4 is a diagrammatical view showing the manner of winding the coils. Figs. 5 and 6 are views of modified forms of armature. Fig. 7 is a view showing a detail of construction. Fig. 8 is a section on the line 8 8 of Fig. 1, the parts being shown in the same position as Fig. 2. Fig. 9 is a view similar to Fig. 8, but showing a slight modification and showing the parts in the same position as in Fig. 1; and Fig. 10 is a section showing a detail.

Like marks of reference refer to similar parts in the several views of the drawings.

15 is a base-plate, to which are secured two coil-supports 16, a curved scale-plate 17, and a curved trough 18, adapted to contain oil or the like and act as a dash-pot to quiet or dampen the vibrations of the pointer. Extending upward from the coil-supports 16 are two posts 19, the tops of which are connected by a bar 20. Carried by lugs 21, extending inwardly from the coil-supports 16, is an inverted-U-shaped frame 22. (Best shown in Fig. 3.) Carried by each of the coil-supports 16 is a coil 25. The coils 25 are inclined in opposite directions, as best shown in Figs. 8 and 9, and are wound, as indicated in Fig. 4, so that the current will flow in opposite directions in them.

26 is a shaft the lower end of which rests in a bearing 27, Fig. 2, in the U-shaped frame 22, and the upper end in a bearing 28 in a plug 29, carried by the cross-bar 20. Carried by the shaft 26 is a U-shaped armature, consisting of a horizontal bar 31 and two downwardly-projecting blades 32, which enter the coils 25. The bar 31 may be made of aluminium or other non-magnetic metal and the blades 32 only of magnetic metal, as iron, as shown in Figs. 1, 3, 4, and 9, or the entire armature may be made of iron, as shown in Figs. 5 and 6. The blades 32 may also be turned, as shown in Fig. 6, so that their edges are presented to the coils instead of their faces, as shown in the other views of the drawings. In the modification shown in Fig. 9 the blades 32 extend below the coils 25, and the lower parts of said blades move farther into the magnetic field of said coils as the armature rotates, while in the construction shown in the other views of the drawings the upper parts of the blades move farther into the magnetic field as the armature rotates. By the construction shown in Fig. 9 the force of the coil tends to raise the moving parts, and hence reduce the friction on the pivot. In this construction the coils 25 are inclined in the opposite direction to the corresponding coils shown in the other views.

Carried by the shaft 26 is a block 35, to which are secured a pointer 36 and two rods 37, provided with counterbalance-weights 38. Secured to the pointer 38 is a vane 39, which projects into the trough 18, which, as above described, acts as a dash-pot to dampen the vibrations of the pointer 36. The pointer 36 is held in its normal position by a spring 40, one end of which is secured to the shaft 26 and the other to a pin 41, carried by a disk 42. The disk 42 is arranged so that it can be rotated to regulate the tension of the spring 40.

43, Figs. 8 and 10, represents U-shaped guards, of iron or other magnetic material, which are placed over the upwardly-inclined ends of the straight portions of the coils 25 when an armature entirely of iron is used in order to cut off a portion of the magnetic field generated by said straight parts of the coils from the cross-bar 31 of the armature.

When current is passed through the coils 25, the parts being in the position shown in Fig. 1, the armature is thrown around in the direction of the arrows in Fig. 1, the wings 32 passing farther into the magnetic field of said coils as said field increases with the current. As the inclination of the wings to the coils remains the same throughout the travel of the armature the wings pass into the armature at a rate proportional to the current, and hence the pointer 36 travels at a rate proportional to the current, enabling the use of a uniform scale. As is well known, when lines of magnetic force are compelled to pass through the air they tend to spread out and form a larger field, while if a good magnetic conductor is provided for the said lines they will be concentrated in said conductor. On this account when the straight parts of the coils 25 are not protected by the guards 43 the field generated by said straight parts will extend upwardly, so as to bring the bar 31 of the armature within it. In case the bar 31 of the armature is made of iron the effects of the field generated by said straight parts of the coils 25 will be to throw the said bar at right angles thereto, thus giving an auxiliary impulse to the armature during the first part of its travel and enabling very small quantities of current to be measured. In case the guards 43 are used the magnetic flow generated by the straight parts of the coils 25 will be concentrated in said guards, and consequently cut off from the bar 31 of the armature. If it is desired to entirely eliminate the effect of the straight part of the coils on the bar 31, the guards 43 may be made wide enough to cover the entire straight part of the coils adjacent to the side bar; but if it is desired to only eliminate a part of the effect narrow guards may be used, such as are shown in the drawings.

In case the wings 32 extend below the coils 25, as shown in Fig. 9, the lifting power of the said coils tends to raise the wings, and consequently all the moving parts, thus decreasing the friction on the pivot 27 and increasing the delicacy of the instrument.

I am aware that electrical measuring instruments have heretofore been made in which a shaft inclined to a coil has been provided with a plate or armature which was also inclined to said shaft so that the inclination of the armature to the coil varied throughout its travel, and therefore do not claim such construction.

Having fully described my invention, what I claim as new, and desire to secure by Letters Patent of the United States, is—

1. In an electrical measuring instrument, the combination with a rotary member, of a coil inclined to the axis of said rotary member, a lateral arm carried by said rotary member, and an armature-blade carried by said lateral arm and extending therefrom into said coil.

2. In an electrical measuring instrument the combination with a pivotally-mounted member, of a coil inclined to the axis of said pivotally-mounted member, and an armature-blade carried by said pivotally-mounted member and parallel therewith.

3. In an electrical measuring instrument, the combination with a pivotally-mounted member, of a coil inclined to the axis thereof, and an armature-blade carried by said pivotally-mounted member, the same inclination being maintained between said blade and coil throughout the travel of said pivotally-mounted member, said blade projecting below said coil, whereby the action of said coil will tend to lift said pivotally-mounted member.

4. In an electrical measuring instrument, the combination with a pivotally-mounted member, of two coils oppositely inclined to the axis of said pivotally-mounted member, and two armature-blades carried by said pivotally-mounted member and projecting into said coils.

5. In an electrical measuring instrument, the combination with a pivotally-mounted member, of two coils oppositely inclined to the axis of said pivotally-mounted member and wound in opposite directions, and two armature-blades carried by said pivotally-mounted member and projecting into said coils.

6. In an electrical measuring instrument the combination with a pivotally-mounted member, of two coils oppositely inclined to the axis of said member, and two armature-blades carried by said pivotally-mounted member and parallel with its axis, said blade projecting into said coils.

7. In an electrical measuring instrument, the combination with a pivotally-mounted member, of two coils oppositely inclined thereto, each of said coils being composed of a curved part and a straight part and having these straight parts adjacent, and two armature-blades carried by said pivotally-mounted member and projecting into said coils.

8. In an electrical measuring instrument, the combination with a pivotally-mounted member, of two coils oppositely inclined to the axis thereof and wound in opposite directions, each of said coils being composed of a curved part and a straight part and having their straight parts adjacent, and two armature-blades carried by said pivotally-mounted member parallel to its axis and projecting into said coils.

In testimony whereof I have hereunto set my hand and affixed my seal in the presence of the two subscribing witnesses.

JOSHUA F. BEGOLE. [L. S.]

Witnesses:
W. A. ALEXANDER,
DAVID STANNARD.